United States Patent [19]

Clegg et al.

[11] 4,172,512

[45] Oct. 30, 1979

[54] MACHINE TOOL WITH COMMON DRIVE FOR WORKTABLE AND PALLET SHUTTLE

[75] Inventors: Russell B. Clegg, Milwaukee; Richard Johnstone, Brookfield, both of Wis.

[73] Assignee: Kearney & Trecker Corporation, West Allis, Wis.

[21] Appl. No.: 827,232

[22] Filed: Aug. 24, 1977

[51] Int. Cl.[2] .............................................. B65G 47/00
[52] U.S. Cl. ..................... 198/339; 29/33 P; 198/472
[58] Field of Search ............... 198/339, 472, 344, 345, 198/648, 346, 436; 214/16.1 DB; 29/33 P, 563; 269/71, 56

[56] References Cited

U.S. PATENT DOCUMENTS

| | | | |
|---|---|---|---|
| 2,791,338 | 5/1957 | Thaon de Saint-Andre | 214/16.1 DB |
| 3,099,873 | 8/1963 | Brainard et al. | 198/339 |
| 3,693,965 | 9/1972 | Mitsengendler | 269/71 |
| 3,825,245 | 7/1974 | Osburn et al. | 198/339 |
| 3,986,617 | 10/1976 | Blomquist | 198/339 |

Primary Examiner—Joseph E. Valenza
Attorney, Agent, or Firm—Cyril M. Hajewski; Donald J. Piggott

[57] ABSTRACT

The worktable and pallet shuttle of a machine tool are driven by a common motor which is mounted on the worktable base. The motor is coupled to the worktable by gears which engage when the worktable is raised to be indexed and disengage when the worktable is lowered. The motor is coupled to the pallet shuttle by gears which engage when the worktable base is moved into the shuttle position and disengage when the worktable base is moved out of the shuttle position.

10 Claims, 9 Drawing Figures

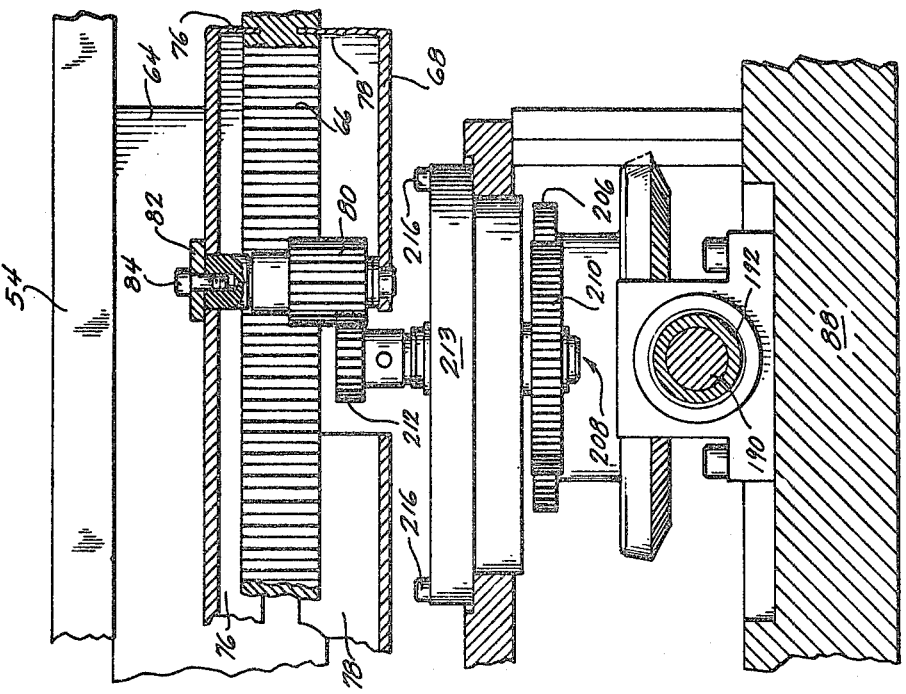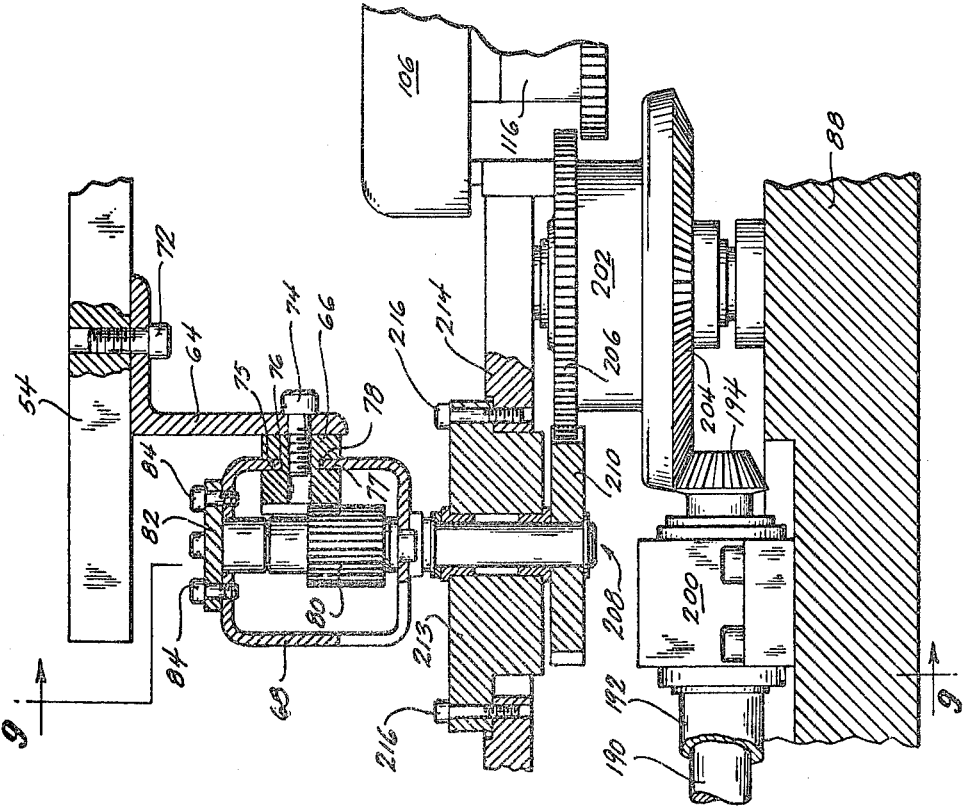

4,172,512

MACHINE TOOL WITH COMMON DRIVE FOR WORKTABLE AND PALLET SHUTTLE

BACKGROUND OF THE INVENTION

This invention relates to machine tools which have indexable worktables that are adapted to receive pallets and have shuttle mechanisms for sliding pallets onto and off of the worktables. In the past, the rotary drive for the worktable and the reciprocating drive for the shuttle mechanism were separate and required separate motors, separate gear trains, separate position feedback systems, and separate control systems for the two drives.

The principal object of this invention is to provide a machine tool in which the rotary worktable and reciprocating shuttle mechanism are driven by a common drive, thereby simplifying the machine tool and reducing its cost.

Other objects and advantages of the invention will be apparent from the detailed description herein.

SUMMARY OF THE INVENTION

A motor is mounted on the worktable base of a machine tool and is coupled to a rotary worktable on the worktable base by first gear means to rotate the worktable. The motor can also be coupled to a pallet shuttle slide by second gear means when the worktable base is moved into the shuttle position to also drive the pallet shuttle slide.

DESCRIPTION OF THE DRAWINGS

FIG. 6 is a fragmentary axial sectional view of the worktable showing the air ducts for cleaning the pallet alignment depressions;

FIG. 7 is a fragmentary axial sectional view showing the outlet air duct for cleaning the pallet alignment depressions;

FIG. 8 is a fragmentary cross sectional view showing the drive gears for the shuttle slide; and FIG. 9 is a fragmentary longitudinal sectional view taken on the line 9—9 of FIG. 8.

DESCRIPTION OF THE PREFERRED EMBODIMENTS

Figure 1:
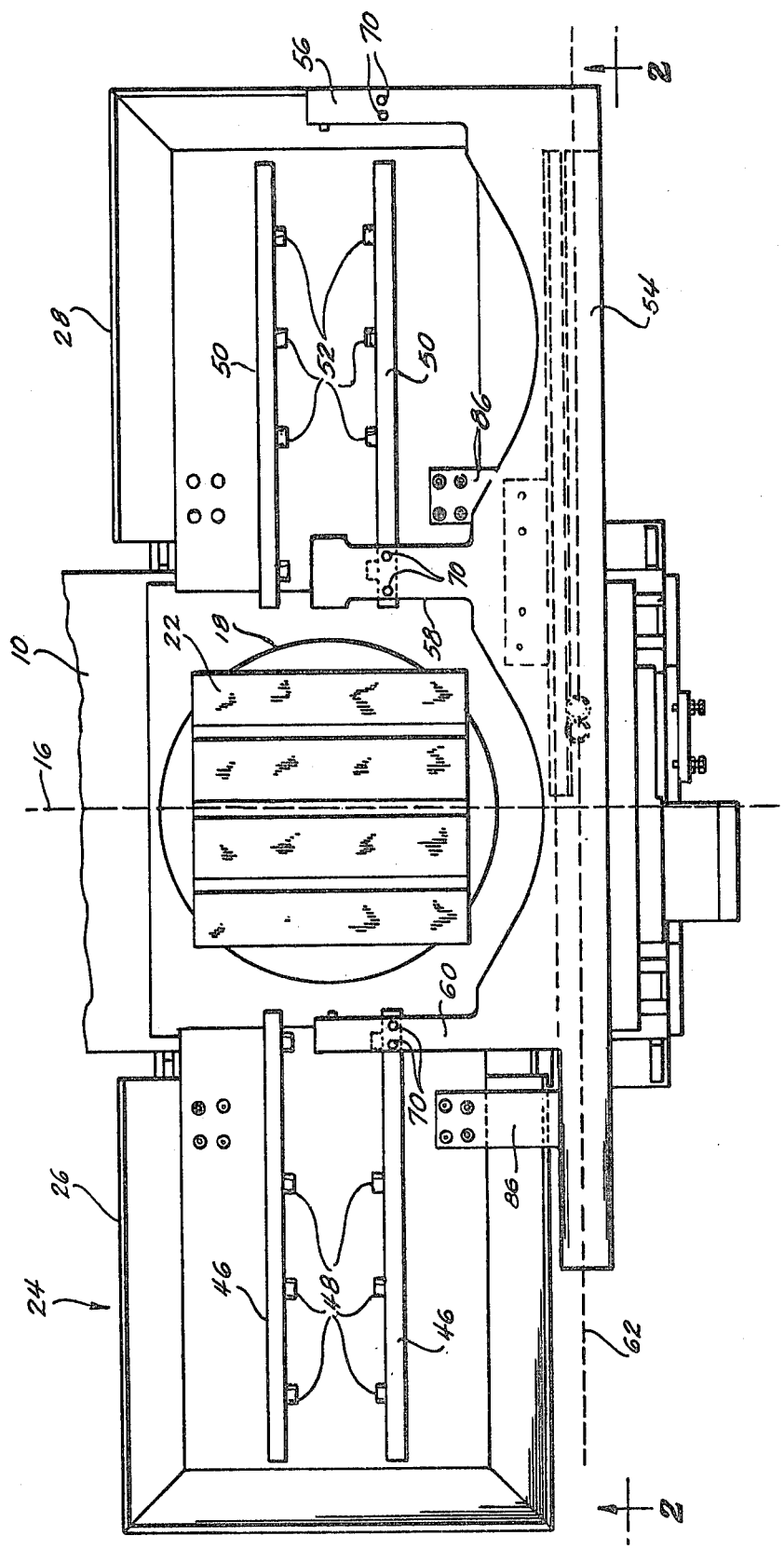
FIG. 1 is a plan view of an embodiment of the invention with the worktable thereof in the shuttle position in operative relation with the shuttle mechanism.
Figure 2:
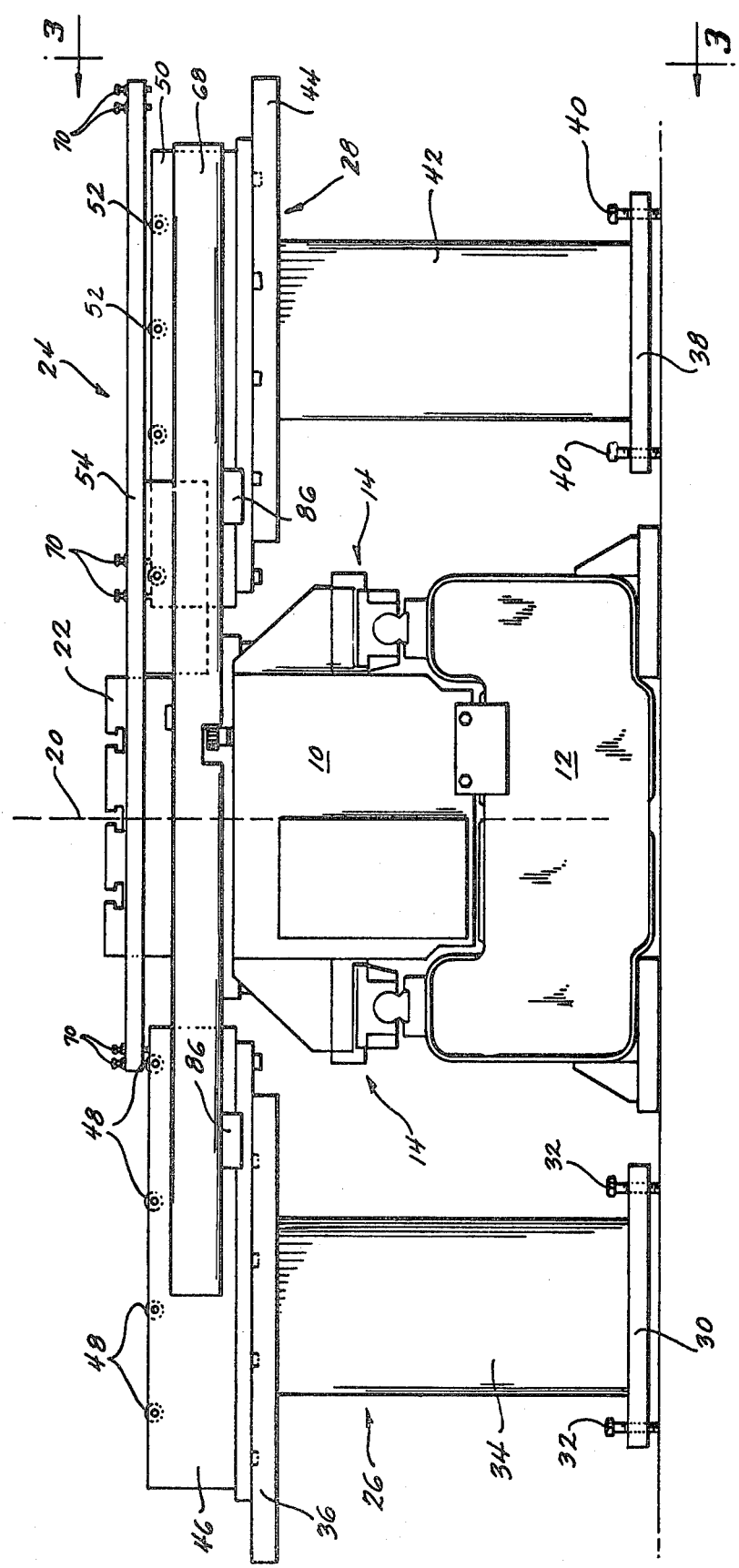
FIG. 2 is an end elevational view taken on the line 2—2 of FIG. 1.
Figure 3:
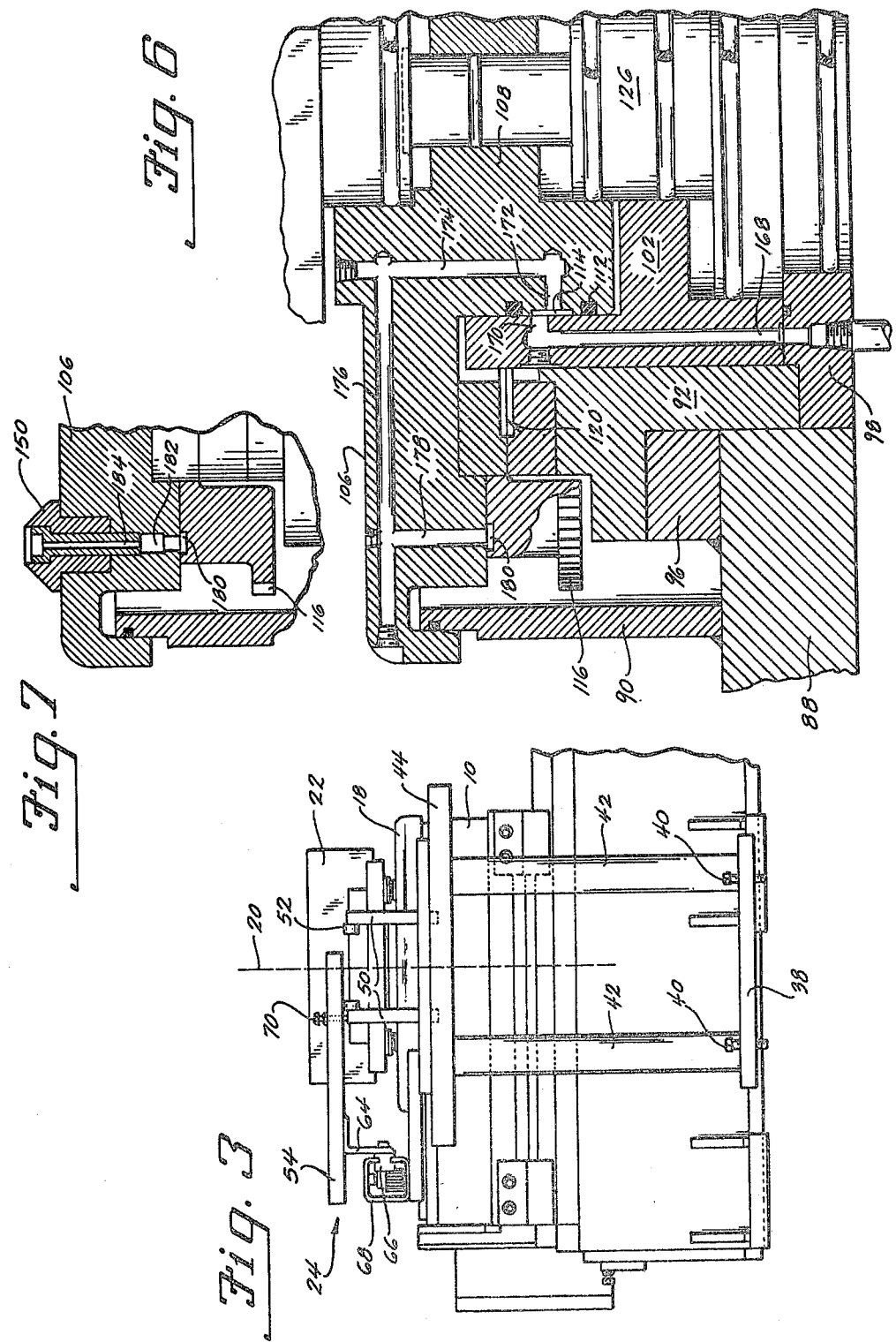
FIG. 3 is a side elevational view taken on the line 3—3 of FIG. 2.

Referring to FIGS. 1, 2, and 3, a worktable base 10 is slidably mounted on a bed 12 (FIG. 2) by horizontal ways 14 for movement along a horizontal Z axis 16 (FIG. 1) toward and away from a machine tool spindle (not shown). A worktable 18 is rotatably mounted on base 10 for rotation about a vertical axis 20 (FIGS. 2 and 3) which is perpendicuar to Z axis 16. Worktable 18 is adapted to slidably receive a conventional pallet 22 and to clamp pallet 22 thereto by means described in later paragraphs.

Pallet 22 can be slid onto or off of worktable 18 by means of a pallet shuttle mechanism 24 which includes two shuttle bases 26 and 28 (FIG. 2) that are located opposite one another in position to flank worktable 18 when worktable base 10 is moved to its shuttle position as shown in FIGS. 1, 2, and 3. Shuttle base 26 has a bottom 30 which is attached to the floor by leveling bolts 32 and supports an upright 34 which, in turn, supports a top 36. Shuttle base 28 is identical in structure, and includes a bottom 38, leveling bolts 40, an upright 42, and a top 44. A pair of spaced apart rails 46 carrying rollers 48 are mounted on shuttle base top 36 to slidably support a pallet 22. A similar pair of spaced apart rails 50 carrying rollers 52 are mounted on shuttle base top 44 to slidably support a pallet 22.

The shuttle mechanism also includes a comb shaped shuttle slide 54 (FIG. 1) having arms 56, 58, and 60 which extend inwardly in position to engage pallets on shuttle bases 26 or 28 or on worktable 18. Shuttle slide 54 is mounted for sliding movement along a horizontal axis 62 (FIG. 1) which is perpendicular to both axes 16 and 20. The shuttle slide arms 56, 58, and 60 are spaced apart to simultaneously transfer two pallets, one pallet being positioned in the space between arms 56 and 58, and the other being positioned in the space between arms 58 and 60. In the position shown in FIG. 1, shuttle slide 54 is in position to move pallet 22 from worktable 18 to shuttle base 26 and at the same time to move a pallet (not shown) from shuttle base 28 to worktable 18. In operation, a pallet would be placed on shuttle base 28 to replace the pallet 22 on worktable 18, but this pallet is omitted from the drawings so that rails 50 and rollers 52 can be seen.

When shuttle slide 54 is moved to the left in FIG. 1, arm 58 pushes pallet 22 onto rails 46 and moves pallet 22 along rails 46 to the center of shuttle base 26. At the same time, arm 56 pushes the pallet (not shown) on shuttle base 28 along rails 50 and onto worktable 18. Worktable 18 is then moved away from the shuttle position and into engagement with the spindle (not shown) to perform the machining operation. While the machining operation is in progress, the previously machined workpiece is removed from shuttle base 26 and is replaced by an unmachined workpiece. When the machining operation is completed, worktable 18 is moved back to the shuttle position shown in FIGS 1, 2, and 3 and shuttle slide 54 is moved from left to right in FIG. 1 to move one pallet from worktable 18 to shuttle base 28 while the other is moved from shuttle base 26 to worktable 18.

Referring to FIG. 3, shuttle slide 54 is supported on its rear end by an elongated bracket 64 which is attached at its lower end to a rack gear 66 which is slidably mounted in a horizontal housing 68. On its front end, shuttle slide 54 is supported by adjustable fingers 70 which slide on rails 50 and 46. The lower portion of fingers 70 are made of a low friction plastic for ease of sliding and to prevent wear on rails 50 and 46. As fingers 70 wear, they are adjusted to compensate for the wear and can be easily replaced when they wear far enough.

The details for the mounting of the rear of shuttle slide 54 are shown more clearly in FIGS. 8 and 9. Bracket 64 is connected to slide 54 by bolts 72 and is connected to rack 66 by bolts 74. Rack 66 is slotted at 75 and 77 to slidably engage opposed lips 76 and 78 on the front of housing 68.

Rack 66 is engaged by a shuttle gear 80 which is attached within housing 68 by a top plate 82 which is attached to housing 68 by bolts 84. Shuttle gear 80 is rotatably attached to top plate 82 and to the bottom of housing 68 and serves to drive slide 54 via rack 66 as is described in later paragraphs.

Housing 68 is attached to the shuttle base tops 36 and 44 by brackets 86 (FIG. 1) and is supported thereby. Housing 68 supports rack 66 which, in turn, supports the rear end of shuttle slide 54 whose front end is supported by fingers 70.

Figure 4:
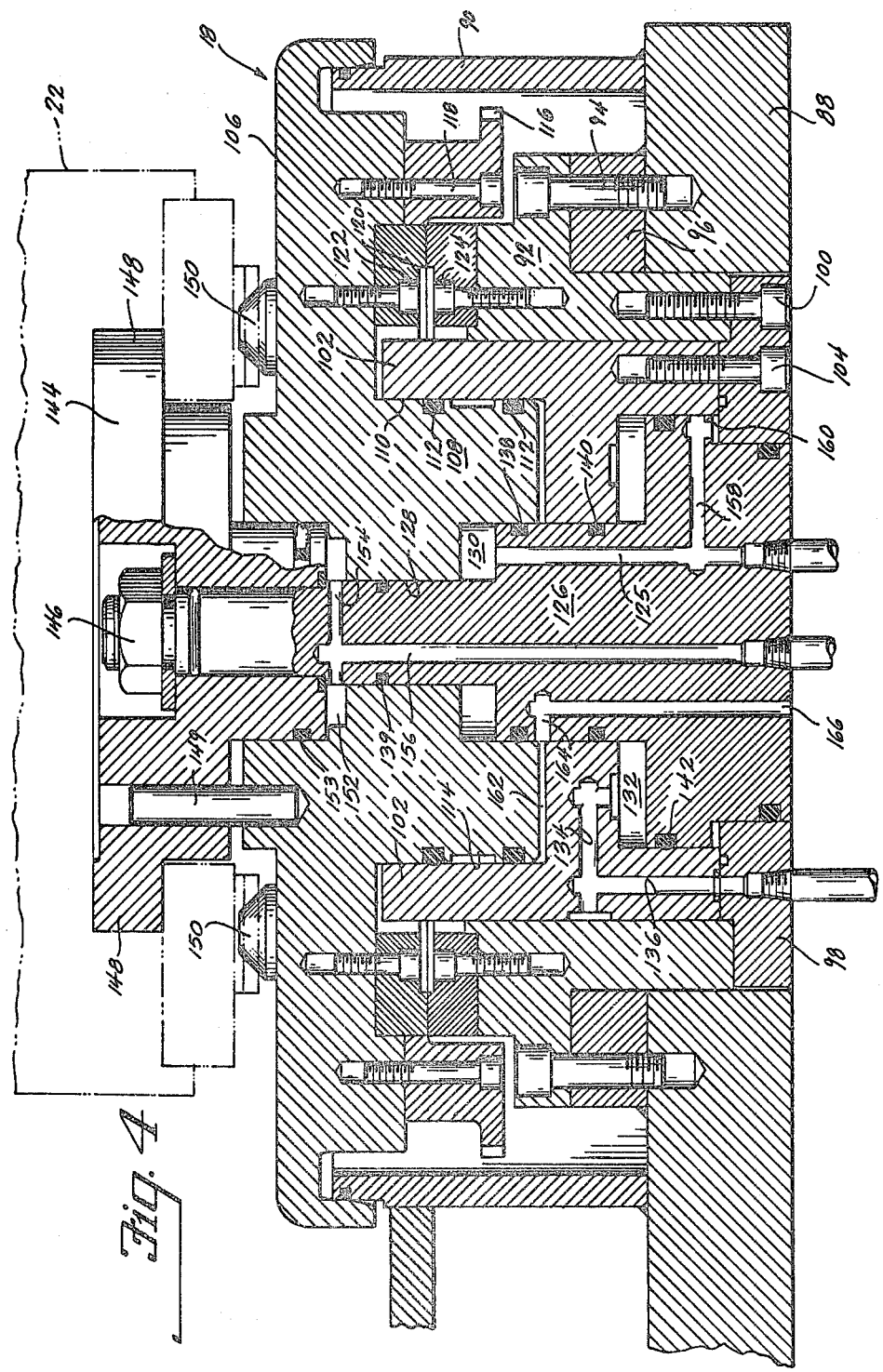
FIG. 4 is an axial sectional view of the worktable support and indexing means therefor.

Before describing the drive means for worktable 18 and shuttle slide 54, the structure and operation of worktable 18 will first be described. Worktable 18 is supported by a base plate 88 (FIG. 4) which has a hollow cylindrical housing 90 welded thereto and an outer cylinder 92 bolted thereto by bolts 94. A spacer ring 96 extends between base plate 88 and outer cylinder 92. A base ring 98 is bolted to the bottom of outer cylinder 92 by bolts 100 and an inner cylinder 102 is bolted to base ring 98 by bolts 104. The above-described portions of worktable 18 comprise the fixed base, the remaining portions of the table being journalled for rotation on the base and for vertical movement relative to the base.

The table top 106 has a central downwardly extending hub 108 which is slidably engaged in an upper bore 110 in inner cylinder 102. A pair of O-rings 112 are seated in grooves in hub 108 and serve to seal in compressed air which is introduced into an air groove 114 in hub 108 by conventional means not shown. The compressed air is used to blow chips away from the locating guide buttons as described in later paragraphs. Table top 106 has a ring gear 116 bolted thereto by bolts 118 which serves to rotate table top 106 when it is desired to index it. The drive for ring gear 116 will be described in later paragraphs. A toothed coupling 120 is attached to table top 106 and outer cylinder 92 by bolts 122 and 124. Toothed coupling 120 indexes table top 106 to one of a precisely determined group of angular positions when it is indexed. For purposes of indexing, table top 106 is raised to break connection of the two parts of toothed coupling 120, then is rotated via ring gear 116 by the required number of degrees, and is then set down on toothed coupling 120, which moves it to the exact angular position desired.

Table top 106 is raised and lowered by hydraulic fluid introduced through a duct 125 in a central piston 126 which extends through a bore 128 in hub 108 and forms a hydraulic chamber 130 which is bounded on the bottom by a surface of piston 126 and is bounded on the top by a surface of table top 106. When hydraulic fluid is introduced into chamber 130 it raises table top 106 and when the fluid is evacuated from chamber 130 it allows table top 106 to drop. Piston 126 can be driven down to clamp a pallet 22 on top of table top 106 by introducing hydraulic fluid into another chamber 132 which is bounded on the bottom by a surface of piston 126 and is bounded on the top by a surface of inner cylinder 102. Hydraulic fluid is introduced into chamber 132 via ducts 134 and 136. Chamber 130 is sealed by O-rings 138 and 139 and chamber 132 is sealed by O-rings 140 and 142, all of the O-rings being seated in corresponding grooves in piston 126.

Piston 126 has a clamp member 144 attached to the top thereof by a nut 146. Clamp member 144 has overhanging edges 148 which ride in the clamping slots of pallet 22 and bear on the lower portion thereof to clamp pallet 22 to table top 106. Four precision alignment buttons 150 are mounted on table top 106 and interact with conical alignment depressions on pallet 22 to precisely align pallet 22 with respect to the Z axis. An alignment pin 149 extends through bores in clamp member 144 and table top 106 to prevent relative angular motion therebetween. A hydraulic chamber 152 is formed between the bottom of clamp member 144 and table top 106 to lift clamp member 144 to free pallet 22 to be shuttled. Hydraulic fluid is introduced into chamber 152 via ducts 154 and 156 in piston 126. O-rings 153 and 139 seal chamber 152.

When table top 106 is raised by introducing hydraulic fluid into chamber 130 through duct 125, a duct 158 which is coupled to duct 125 also introduces hydraulic fluid into a chamber 160 formed between a portion of piston 126 and a portion of base ring 98. When hydraulic fluid is introduced into chamber 160 it causes piston 126 to rise along with table top 106. When table top 106 and piston 126 are raised together, clamp 144 is held down by hydraulic pressure in chamber 130.

In the operation of worktable 18, to clamp pallet 22 on table top 106, hydraulic fluid is introduced into chamber 132 via ducts 134 and 136. To release the clamp for shuttling, chamber 132 is evacuated and hydraulic fluid is introduced into chamber 152 via ducts 154 and 156. To raise table top 106 and clamp 144 for indexing, chamber 132 is evacuated and hydraulic fluid is introduced into chambers 130 and 160 via ducts 125 and 158 respectively. It should be noted that the clamping action also pulls table top 106 downward. Air is evacuated from the chamber 162 formed at the bottom of hub 108 by ducts 164 and 166 when table top 106 is lowered and is admitted thereto when table top 106 is raised.

A compressed air system is provided in worktable 18 to blow chips away from the alignment depressions in pallet 22 when a new pallet 22 is placed on table top 106. This compressed air system is shown in FIGS. 6 and 7. Referring to FIG. 6, compressed air is routed through ducts 168 and 170 in inner cylinder 102 into compressed air groove 114 in hub 108 of table top 106. This compressed air is carried through ducts 172, 174, 176 and 178 in table top 106 to an annular compressed air groove 180 in ring gear 116. From groove 180, the compressed air is fed via ducts 182 (FIG. 7) to ducts 184 in alignment buttons 150. The compressed air emerges as jets from the tops of alignment buttons 150 and blow chips out of the matching alignment depressions in pallet 22 when it is being initially clamped on table top 106.

Figure 5:
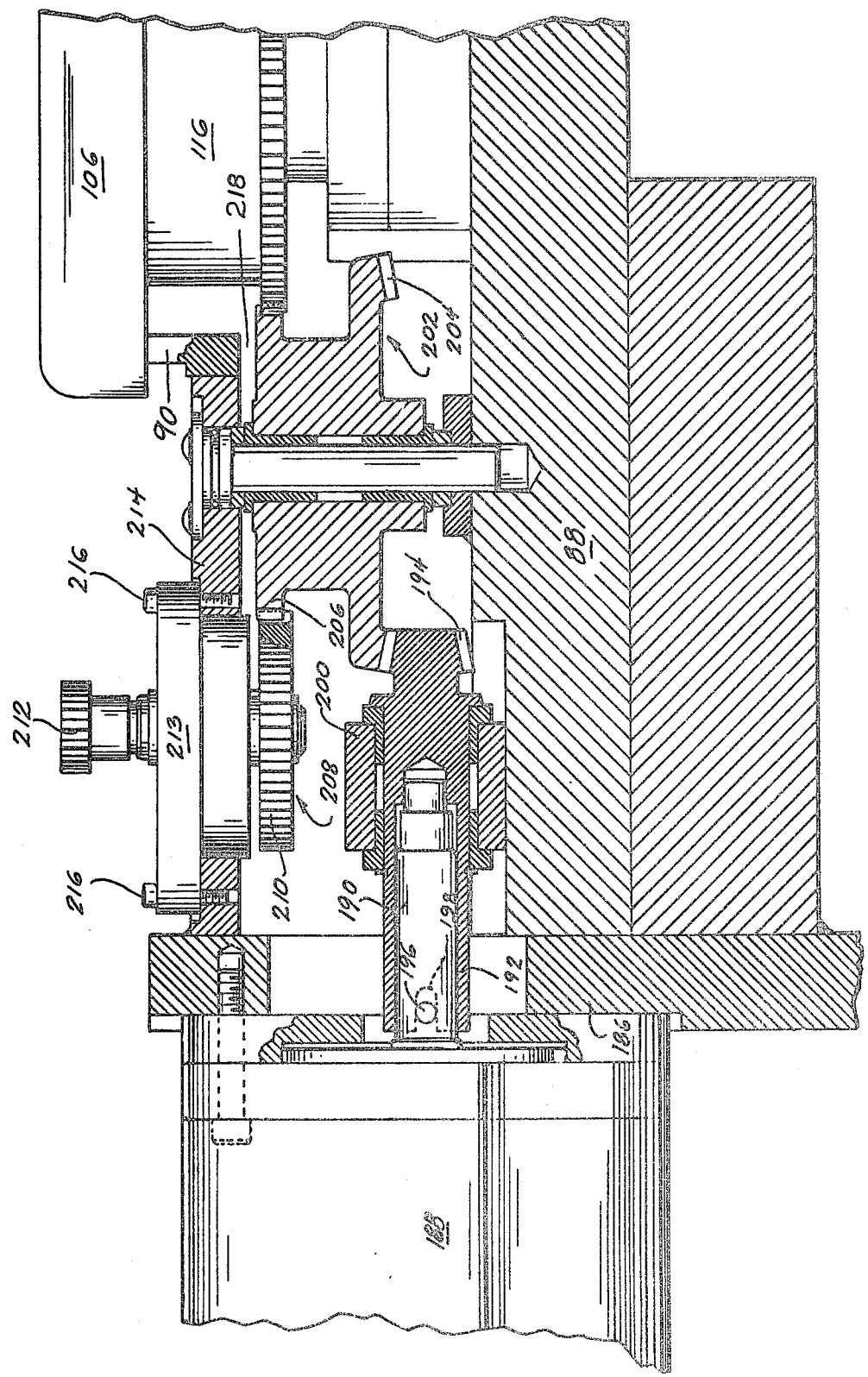
FIG. 5 is a cross sectional view showing the drive motor and drive gear train for indexing the worktable.

The drive means for ring gear 116 is shown in FIG. 5. Base plate 88 has an end plate 186 attached thereto to which is bolted a motor 188. The drive shaft 190 of motor 188 is inserted into a hollow sleeve 192 which has a bevel pinion gear 194 on its other end and is coupled thereto by a pin 196 which extends through drive shaft 190 and engages slots 198 in sleeve 192. Sleeve 192 is journalled to base plate 88 by a conventional bearing assembly 200 which is bolted to base plate 88 by bolts which are not visible in FIG. 5. Bevel pinion 194 drives a cluster gear 202 which has a bevel gear 204 on its bottom and a spur gear 206 on its top. Cluster gear 202 is journalled to base plate 88 by a conventional means and is dimensioned so that spur gear 206 is engaged with ring gear 116 when table top 106 is in its raised position and is disengaged from ring gear 116 when table top 106 is in its lowered position. Spur gear 206 extends through an opening 218 in the cylinder 90 to engage ring 116. Thus, when table top 106 is raised by the hydraulic means described in preceding paragraphs, spur gear 206 meshes with ring gear 116 and permits servo motor 188 to rotate table top 106 for indexing purposes. Motor 188 is controlled by a conventional electrical control circuit (not shown) to index table top 106 through a predetermined angular movement. After the indexing movement is completed, table top 106 is lowered to engage toothed coupling 120 and to disengage gears 206 and 116.

As shown in FIGS. 5, 8, and 9, spur gear 206 also drives a gear assembly 208 which has a lower gear 210 which engages gear 206 and has an upper gear 212 (FIG. 9) which engages shuttle gear 80 only when table base 10 is moved into its shuttle position to drive the shuttle mechanism. Gear assembly 208 is journalled in a block 213 by conventional means. Block 213 is attached to the top 214 of base 10 by bolts 216. Gears 212 and 80 are only engaged when table base 10 is moved into the shuttle position whereby the shuttle mechanism can only be actuated in the shuttle position. Servo motor 188 is controlled by its control circuit to operate in the appropriate direction for the appropriate number of turns to drive shuttle slide 54 in the proper direction to shuttle pallets 22 onto or off of worktable 18. Thus servo motor 188 drives both worktable 18 and shuttle 54 and eliminates the need for separate drive motors for these two units. Servo motor 188 contains a resolver and tachometer which are used as position and velocity feedbck elements when driving the worktable 18. The motor, resolver, and tachometer serve to provide feedback velocity and position information to the control system during a shuttle cycle thus eliminating the need for other prime movers or position feedback devices.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, we hereby claim as our invention:

1. In a machine tool including:
   a bed;
   a table base slidably mounted on said bed for movement along a first axis;
   a worktable rotatably mounted on said base for rotation about a second axis transverse to said first axis;
   a motor mounted on said base; and
   drive means coupled between said motor and said worktable to rotate the worktable;
   the improvement comprising:
   a pallet shuttle slide slidably mounted on a frame for movement along a third axis transverse to said first axis and to said second axis, said pallet shuttle slide being positioned to slide pallets onto and off of said worktable in one position thereof; and
   drive means coupling said motor to said pallet shuttle slide when said worktable is in position to transfer pallets thereto whereby said motor drives said shuttle slide.

2. The machine tool according to claim 1 wherein said worktable has a top which is journalled for rotation about said second axis, and also comprising:
   means for moving said table top along said second axis between a raised and lowered position;
   a first gear driven by said motor and connected to actuate both said worktable and said shuttle slide selectively; and
   a second gear coupled to said table top and positioned to engage said first gear when said table top is in its raised position for rotating said table top and to be disengaged from said first gear when said table top is in its lowered position.

3. The machine tool according to claim 2 and also comprising:
   a third gear engaged to be driven by said first gear; and
   a fourth gear coupled to said pallet shuttle slide, said fourth gear being positioned to engage said third gear when said worktable is moved into position to receive pallets so that said fourth gear will be actuated by said third gear for driving said pallet shuttle slide in its path of travel to transfer pallets onto and off of said worktable.

4. The machine tool according to claim 3 wherein said fourth gear is a pinion gear, and also comprising:
   a rack gear coupled to said pallet shuttle slide and engaged with said pinion gear to be driven thereby.

5. The machine tool according to claim 2 wherein said first gear is a cluster gear having a first portion which is positioned to engage said second gear and having a second portion which is positioned to be driven by said motor.

6. The machine tool according to claim 3 wherein said third gear is a gear assembly having a first portion which is positioned to engage said first gear and having a second portion which is positioned to engage said third gear.

7. The machine tool according to claim 1 and also comprising:
   a pair of shuttle bases positioned in spaced apart relation opposite said one position of said worktable, said pallet shuttle slide being slidably mounted on top of said shuttle bases, and wherein said drive means for moving said shuttle slide comprises a first drive portion mounted on said shuttle bases and a second drive portion mounted on said worktable and being engaged with said first drive portion when said worktable is in said one position.

8. The machine tool according to claim 7 wherein said first drive portion comprises a rack gear attached to said pallet shuttle slide and a pinion gear engaged with said rack and positioned to be engaged with said second drive portion when said worktable is in said one position.

9. The machine tool according to claim 8 and also comprising:
   an elongated housing mounted on said shuttle base below said pallet shuttle slide, said rack gear being slidably mounted on said housing and said pinion gear being rotatably mounted in said housing.

10. The machine tool according to claim 9 wherein said housing supports the rear of said pallet shuttle slide and further comprising fingers projecting downwardly from the front of said pallet shuttle slide and slidably supported by said shuttle bases to support the front of said pallet shuttle slide.

* * * * *